3,174,874
PROCESS OF SURFACE SIZING PAPER WITH STABLE CATION-ACTIVE PLASTIC DISPERSIONS
Hans Fikentscher, Bad Durkheim, Karl Herrle and Gernot Winter, Ludwigshafen (Rhine), Alfred Mueller, Biblis, Hesse, and Johann Georg Reich and Heinz Voss, Ludwigshafen (Rhine), Germany, assignors to Badische Anilin- & Soda-Fabrik Aktiengesellschaft, Ludwigshafen (Rhine), Germany
No Drawing. Filed Nov. 28, 1960, Ser. No. 71,902
Claims priority, application Germany, Dec. 1, 1959, B 55,731; Nov. 19, 1960, B 60,147
3 Claims. (Cl. 117—155)

This invention relates to stable cation-active polymer dispersions and a process for the production of such dispersions. By "cation-active polymer dispersions" we understand dispersions in which the polymer particles carry positive charges.

In conventional aqueous polymer dispersions, the polymer particles are negatively charged by the emusifying agent, by the monomers used or by incorporated catalyst fragments. It is also known to prepare cation-active plastic dispersions by using cationic emulsifying agents. In most cases, however, such dispersions are very unstable. It is furthermore known to polymerize quaternary amino derivatives of acrylic acid or of an acrylamide of the general formula:

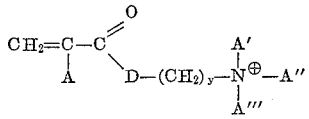

in which D stands for O or N—A, A stands for H or $CH_3$, and A′, A″ and A‴ stand for alkyl hydroxyalkyl, aralkyl or aryl, in admixture with other polymerizable compounds which do not contain nitrile groups. In general, however, the stability of cation-active plastic dispersions prepared in this way also leaves much to be desired.

It is an object of this invention to provide cation-active polymer dispersions which are stable and substantially resistant to the coagulating influence of elevated temperatures. It is another object of this invention to provide cation-active polymer dispersions which can be stored and stirred and to which may be added solutions of polyelectrolytes, such as calcium chloride or aluminum sulfate. A further object of this invention is to provide a process for the production of stable cation-active polymer dispersions. Other objects of the invention will become apparent to the expert from the following description.

We have found that cation-active dispersions containing cation-active dispersing agents and copolymers from 99 to 50%, preferably 97 to 70%, by weight of ethylenically unsaturated monomers difficultly soluable in water and 1 to 50%, preferably 3 to 30%, by weight (with reference to the total amount of monomers) of N- or C-vinyl substituted heterocyclic compounds which have one quaternary nitrogen atom in the nucleus, are very stable in storage and resistant to heat.

Dispersions according to this invention are prepared with advantage by polymerizing 99 to 50%, preferably 97 to 70%, by weight of ethylenically unsaturated monomers difficultly soluble in water with 1 to 50%, preferably 3 to 30%, by weight (with reference to the total amount of monomers) of N- or C-vinyl substituted heterocyclic compounds which contain one quaternary nitrogen atom in the nucleus in aqueous dispersions containing cation-active dispersing agents at temperatures between room temperature and about 100° C., preferably between about 50° and 90° C. It is of special advantage to use in the production of the said dispersions, in addition to the cation-active dispersing agents, 1 to 5% by weight (with reference to the total amount of monomers) of non-ionic dispersing agents.

Particularly suitable N- or C-vinyl substituted heterocyclic compounds are those which contain only nitrogen atoms as hetero-atoms in the nucleus, especially N-vinyl substituted derivatives of imidazole and C-vinyl substituted derivatives of pyridine of the general formulae:

(I)
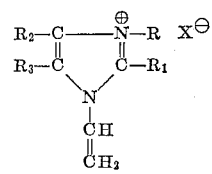

and (II)
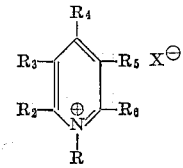

In the foregoing formulae, $X^\ominus$ stands for an anion, especially for a hydrohalic acid or alkylsulfuric acid radical, preferably for one of the anions $Cl^\ominus$, $Br^\ominus$, $I^\ominus$, $SO_4(CH_3)^\ominus$, $SO_4(C_2H_5)^\ominus$ and $SO_4(C_3H_7)^\ominus$, R stands for an alkyl, cycloalkyl or aralkyl radical, preferably for a methyl, ethyl, propyl, cyclohexyl or benzyl group, $R_1$ to $R_6$ stand for hydrogen atoms and/or alkyl radicals with 1 to 3 carbon atoms, such as methyl, ethyl, propyl and/or isopropyl groups, and additionally one of the substituents $R_4$ to $R_6$ must be a vinyl group. The substituents $R_2$ and $R_3$ together may also stand for the radical —CH=CH—CH=CH—.

Suitable compounds of the general Formula I or II include: 1-methyl-2-vinyl-pyridinium bromide and methosulfate, 1,2-dimethyl-5-vinyl-pyridinium methosulfate, 1-ethyl-2-vinyl-pyridinium chloride and bromide, 1-propyl-2-vinyl-pyridinium chloride, 2-vinyl-pyridinium-ethyl sulfate, 1-benzyl-4-vinyl-pyridinium choride, N-vinyl-N′-methyl-imidazolium bromide, methosulfate and ethyl sulfate, N-vinyl-N′-benzyl-imidazolium chloride, N-vinyl-N′-ethyl-imidazolium chloride, N-vinyl-N′-isopropyl-imidazolium chloride, 1-viny 1-3-methyl-benz-imidazolium methosulfate, 1-methyl-2-vinyl-quinolinium methosulfate and 1-benzyl-4-vinyl-quinolinium chloride.

Such ammonium compounds can be prepared in the conventional way from the corresponding tertiary amines by reaction with conventional alkylating agents, such as alkyl halides or dialkyl sulfates.

Ethylenically unsaturated monomers difficultly soluble in water which are suitable for the production of stable cation-active dispersions according to this invention are generally those which are not incorporated into the polymer chain as anions or potential anions and whose water solubility at room temperature is less than about 7 grams of monomer in 100 grams of water. Suitable compounds of the said kind include: acrylic and methacrylic acid esters of straight-chain, branched and cycloaliphatic alcohols with 1 to 20 carbon atoms, such as acrylic or methacrylic esters of methyl, ethyl, propyl, isopropyl, normal-butyl, isobutyl, normal-pentyl, normal-hexyl, cyclohexyl, octyl, cyclooctyl, decyl, dodecyl, palmityl and stearyl alcohol; vinyl esters of straight-chain aliphatic carboxylic acids with 2 to 20 carbon atoms, such as vinyl acetate, vinyl propionate, vinyl butyrate and vinyl stearate; acrylonitrile and methacrylonitrile, vinyl halides, such as vinyl chloride, vinyl fluoride and vinylidene chloride, vinylaromatic compounds, such as styrene, ortho-chlorostyrene, α-methylstyrene, and vinyltoluenes as well as mixtures of these monomers with each other or with diolefins with 4 or 5 carbon atoms, such as butadiene-1,3, 2-chlorobutadiene-1,3 and isoprene, or with other ethylenically unsaturated monomers which cannot or only with difficulty be polymerized by themselves, such as the methyl, ethyl, propyl and butyl diesters of maleic and fumaric acid, or viny ethers, such as vinyl isobutyl ether. Water-soluble non-anionic vinyl compounds, such as acrylamide and methacrylamide or vinyl pyrrolidone, may also be used as copolymerization components in amounts of up to about 10% by weight with reference to the total amount of monomers.

Suitable cation-active dispersing agents include the water-soluble salts of fatty amines and hydroxyethylated fatty amines with lower aliphatic carboxylic acids or inorganic acids. Such cation-active dispersing agents can be represented by the general formula:

(III)
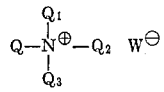

in which $W^\ominus$ preferably stands for the anions $Cl^\ominus$, $Br^\ominus$, $I^\ominus$, $SO_4^\ominus$, $SO_4^{2\ominus}$, $SO_4(CH_3)^\ominus$ $SO_4(C_2H_5)^\ominus$, $SO_4(C_3H_7)^\ominus$ and $CH_3COO^\ominus$, Q stands for a straight-chain or branched alkyl or alkenyl radical with 10 to 20 carbon atoms, and $Q_1$, $Q_2$ and $Q_3$ each stand for a hydrogen atom, an alkyl radical with 1 to 4 carbon atoms, or the group

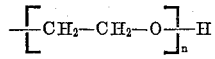

in which n denotes a whole number between 5 and 20. $Q_1$, $Q_2$ and $Q_3$, together with the positively charged nitrogen atom, may also stand for a heterocyclic ring which contains 4 or 5 further atoms, for example for an imidazole or pyridine ring.

Suitable cation-active dispersing agents of the said kind include decylammonium methosulfate, N-ethyl-dodecylammonium bromide, N,N-dimethyl-dodecylammonium chloride, N-methyltridecylammonium iodide, stearylammonium bromide and oleylammonium bromide, as well as the chlorides, bromides, sulfates, methosulfates and acetates of hydroxyethylated fatty amines prepared in the usual way by reaction of 5 to 20 times the molar amount of ethylene oxide with amines such as decylamine, N-methyldodecylamine, N - propyl - tridecylamine, stearylamine and oleylamine, and furthermore also N-dodecyl-pyridinium bromide and N-tridecyl-imidazolium sulfate.

Suitable non-ionic dispersing agents include hydroxyethylation products of fatty alcohols and phenols, i.e., of substances of the general formula:

(IV)
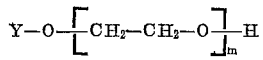

in which Y stands for an alkyl or alkenyl radical with 10 to 20 carbon atoms, for a phenyl radical or for a phenyl radical substituted by one or more alkyl groups, and m preferably stands for a whole number between 10 and 30.

Such hydroxyethylation products can be prepared in the usual way by reaction of 10 to 30 times the molar amount of ethylene oxide with fatty alcohols such as decyl, dodecyl, stearyl, sperm oil and oleyl alcohol, or with phenols such as phenol, para-decylphenol, para-isooctylphenol and para-hexylphenol. Polymers of vinyl pyrrolidone with k-values between 20 and 100, which may also contain small amounts of acrylamide and/or methacrylamide or vinyl propionate polymerized into the same, are also well suited for use as non-ionic dispersing agents.

Cation-active protective colloids, such as polyvinylpyridinium salts or polyvinyl-imidazolium salts, may also be used, in addition to the cation-active dispersing agents, in the production of the said dispersions.

The cation-active dispersing agents are advantageously used in amounts of 1 to 4% by weight with reference to the amount of monomers. Thinly liquid to highly viscous cation-active dispersions can be obtained, depending on the nature and amount of dispersing agents used. For example, highly viscous cation-active plastic pastes are mostly obtained if the monomers are polymerized in admixture with polyvinyl pyrrolidone or if polyvinyl pyrrolidone is added after polymerization is complete.

It is surprising that in the process for the production of cation-active dispersions according to this invention cation-active dispersing agents should have to be used in order to obtain stable dispersions. If only non-ionic dispersing agents are employed, cation-active dispersions are obtained which are much less stable, for example when stored or stirred or when aqueous solutions of calcium chloride or aluminum sulfate are added to the same. As mentioned above, it is furthermore of advantage to use, in addition to cation-active dispersing agents, also non-ionic dispersing agents in the process for the production of cation-active dispersions according to this invention.

The copolymerization process according to the invention is carried out in aqueous dispersion, preferably in the pH range of 1 to 7, while using conventional water-soluble polymerization catalysts, such as persulfates, percarbonates or, advantageously, hydrogen peroxide. In general, 0.3 to 2% by weight (with reference to the total amount of monomers) of catalysts of the said kind are used in the process according to the present invention. The addition of small amounts of water-soluble salts of iron, cobalt, copper and nickel is sometimes of advantage. In general, dispersions with a polymer content of up to 60% by weight (calculated on the total weight of dispersion) can be prepared.

The storage life of cation-active plastic dispersions according to this invention is similar to that of anion plastic dispersions. The cation-active dispersions according to this invention are thus much more stable than known cation-active dispersions. In general, they are also resistant to the coagulating influence of elevated temperatures and to stirring within wide ranges and are compatible with most aqueous pigment pastes. Moreover, they are in general stable to electrolyte solutions, for example to 20% solutions of calcium chloride and to solutions of aluminum sulfate. They maye be diluted at will and are suitable, for example, for improving textiles and for the production of films and coatings.

In papermaking, cation-active dispersions according to the invention may be added in any amount to the paper pulp in the beater. A proportion of 1 to 15% of quaternary copolymerization component in the polymer is in general sufficient for this purpose.

The dispersions according to this invention may also be used with advantage for the surface sizing of paper. By "surface sizing" we understand sizing the paper from its surface or sizing the surface of the paper. Surface sizing is preferably carried out in that part of the paper machine in which the finished web of paper is dried, for example by means of a size press. Surface sizing of paper with the new dispersions may, however, also be carried out at some place other than in the paper machine. Dispersions according to this invention which contain 15 to 50%, preferably 15 to 30%, by weight of quaternary copolymerization components in the polymer are especially suitable for surface sizing. When the dispersions according to this invention are used for sizing paper, it is of special advantage to add small amounts of commercial polyethylene imines to the dispersions.

The following examples will further illustrate this invention, but the invention is not restricted to these examples. The parts are parts by weight. The $k$-values were determined according to H. Fikentscher, Cellulosechemie 13, 1932, p. 58.

Example 1

A mixture of 1,500 parts of water, 45 parts of N,N-dimethyl-N-dodecyl-ammonium chloride, 15 parts of a product prepared in the usual manner from dodecyl alcohol and ethylene oxide in the molar ratio 1:25, 45 parts of N-vinyl-N'-methyl-imidazolium methosulfate, 30 parts of 30% hydrogen peroxide, 1,200 parts of vinylidene chloride and 300 parts of ethyl acrylate is polymerized while stirring at 50° to 60° C. in a polymerization vessel. Polymerization is completed after about 10 hours. A dispersion containing about 50% by weight of polymer is obtained which is stable in storage, free from coagulate, and which has a pH of 1.5 and a surface tension of 32 dynes/cm. The $k$-value of the polymer is 60 and its average particle size about 0.2 micron. The dispersion is stable to additions of aqueous solutions which contain 20% by weight of calcium chloride or aluminum sulfate. The softening point of the dry polymer is about 12° C.

Example 2

Half of a mixture of 650 parts of water, 12 parts of 1,2-dimethyl-5-vinyl-pyridinium methosulfate, 12 parts of the acetic acid salt of a product prepared in the usual manner from oleylamine and ethylene oxide in the molar ratio 1:9, 4 parts of product obtained from sperm oil alcohol and ethylene oxide in the ratio 1:25 and 15 parts of 30% hydrogen peroxide is heated to 75° C. in a polymerization vessel. 400 parts of butyl acrylate are emulsified into the other half of the mixture and the resulting emulsion is allowed to flow into the polymerization vessel while stirring during the course of 2 to 3 hours. Polymerization is allowed to proceed for another hour and the whole is then cooled. The dispersion thus prepared contains about 40% by weight of a polymer having an average particle size of about 0.3 micron. The softening point of the dry polymer is −50° C., its $k$-value is 70. The pH of the dispersion is 4.5 and its surface tension 45 dynes/cm.

Example 3

10 parts of N-vinyl-N'-methyl-imidazolium methosulfate, 10 parts of 30% hydrogen peroxide and 4 parts of a product prepared in the usual manner from tridecylamine and ethylene oxide in the molar ratio 1:20 and which has been reacted with dimethyl sulfate to form a salt, are dissolved in 450 parts of water. Half of the solution is heated to 70° to 80° C. in a polymerization vessel. 260 parts of butyl acrylate and 65 parts of acrylonitrile are emulsified in the other half of the solution and the resulting emulsion is allowed to flow within 3 hours into the polymerization vessel. The temperature is kept at about 80° C. for another hour and the whole then cooled. A cation-active dispersion is obtained which has the pH 5 and which does not change even when stored for 2 days at 80° C. It may also be thawed without coagulation after freezing and is stable to additions of aqueous solutions containing 20% by weight of calcium chloride or 10% by weight of aluminum sulfate. The polymer has the $k$-value 70 and an average particle size of about 0.5 micron. Its softening point is about −20° C.

Example 4

800 parts of butadiene are forced into a polymerization autoclave which is charged with a mixture of 2,500 parts of water, 0.2 part of cobalt sulfate, 45 parts of N,N-diethyl-dodecyl-ammonium sulfate, 60 parts of N-vinyl-N'-methyl-imidazolium methosulfate, 40 parts of a product prepared in the usual manner from sperm oil alcohol and ethylene oxide in the molar ratio 1:25, 70 parts of 30% hydrogen peroxide and 1,200 parts of styrene, and the reaction mixture is then heated to 75° C. The pressure rises at first to about 7 atmospheres' gauge and then falls again. Polymerization is continued until there is no further drop in pressure. To remove unreacted monomers, a stream of nitrogen is led over the reaction mixture for 1 to 2 hours and the whole then cooled. The dispersion prepared in this way is free from coagulate and has a solids content of about 45%. The average particle size is about 0.2 micron. The dry polymer is soft and elastic. The dispersion is compatible with aqueous solutions containing 20% by weight of calcium chloride or 10% by weight of aluminum sulfate.

Example 5

A mixture of 1,400 parts of water, 45 parts of N-vinyl-N'-methylimidazolium methosulfate, 22 parts of N,N-diethyl-dodecylammonium sulfate, 22 parts of polyvinyl pyrrolidone with the $k$-value 90, 30 parts of 30% hydrogen peroxide and 0.1 part of cobalt sulfate is copolymerized with 1,200 parts of vinylidene chloride and 300 parts of butyl acrylate in a polymerization vessel at about 55° C. while stirring.

The reaction is ended after about 15 hours and a highly viscous dispersion (paste) is obtained which can be smoothly brushed on, which has a solids content of about 50% by weight and a pH of 3.5. The $k$-value of the polymer is 50 and its average particle size about 0.8 micron; the softening point of the dry polymer is about 2° C.

Example 6

If the 22 parts of polyvinyl pyrrolidone of the $k$-value 90 in Example 5 are replaced by 45 parts of polyvinyl pyrrolidone of the $k$-value 30 and the procedure of Example 5 is otherwise followed, a viscous dispersion is obtained instead of a plastic paste.

The pH value of the dispersion is about 2, but it is also stable at a pH of about 8. Its surface tension is about 25 dynes/cm. The $k$-value of the polymer is 55. The dispersion is unchanged after storage for 48 hours at 80 °C.

If 400 parts of this dispersion are added in a beater to a mixture of 100 parts of unbleached sulfate pulp which has been treated in a beater with the addition of 3,000 parts of water, allowed to circulate for 15 minutes and the pulp dehydrated on a paper machine, a soft supple paper is obtained which after glazing is oilproof and waterproof.

Example 7

A mixture of 2,000 parts of water, 45 parts of N,N-dimethyl-dodecyl-ammonium sulfate, 45 parts of N-vinyl-N'-methyl-imidazolium methosulfate, 22 parts of a product prepared in the usual manner from sperm oil alcohol and ethylene oxide in the molar ratio 1:25, 35 parts of 30% hydrogen peroxide and 300 parts of vinyl chloride is heated to 50° C. in a polymerization autoclave. Initial polymerization is allowed to proceed for 2 hours and then another 800 parts of vinyl chloride are forced in during a period of 8 hours. After another 7 hours, the pressure has fallen to 1 atmosphere gauge and polymerization can be discontinued. A dispersion of low viscosity is obtained which contains about 35% by weight of polymer having an average particle size of 6 microns and a surface tension of 31 dynes/cm.

Example 8

Half of a solution, neutralized with ammonia, of 5 parts of N,N-dimethyl-dodecyl-ammonium sulfate, 10 parts of N-vinyl-N'-methyl-imidazolium methosulfate and 10 parts of 35% hydrogen peroxide in 470 parts of water is heated in a polymerization vessel to 75° C. 32 parts of vinyl pyrrolidone are dissolved in the other half of the solution and 290 parts of butyl acrylate emulsified therein. This emulsion is allowed to flow in the course of 2½ hours into the first half of the solution while stirring. During this period, the temperature of the reaction mixture is kept at about 75° C. After the addition of the emulsion, the temperature is kept at 75° C. for another hour and then nitrogen is led over the reaction product for another hour at the same temperature.

A dispersion is obtained which contains 39% by weight of polymer and which has the pH 6.5. Upon drying it forms a colorless, transparent and slightly sticky film. The $k$-value of the polymer is 60.5. The dispersion is compatible with aqueous pigment pastes and stable for several days at 80° C.

Example 9

A mixture of 1,300 parts of water, 45 parts of N-vinyl-N'-methyl-imidazolium methosulfate, 30 parts of N,N-diethyl-dodecyl-ammonium sulfate, 45 parts of polyvinyl pyrrolidone of the $k$-value 40, 0.05 part of cobalt sulfate, 30 parts of 35% hydrogen peroxide, 1,230 parts of vinylidene chloride and 270 parts of ethyl-hexyl acrylate is heated to 55° to 60° C. in a polymerization autoclave. The reaction temperature is maintained while stirring until the pressure has fallen to normal pressure.

A viscous dispersion is obtained which has the pH 2.5 and which contains 53% by weight of polymer. The $k$-value of the polymer is 50. When dried, the dispersion forms a very soft and supple film (softening point —9° C.) which crystallizes upon tempering. The dispersion is suitable for coating paper.

Example 10

20 parts of N,N-diethyl-dodecyl-ammonium sulfate, 20 parts of N-vinyl-N'-methyl-imidazolium methosulfate and 6.5 parts of a product prepared in the usual manner from ethylene oxide and sperm oil alcohol in the molar ratio 25:1 are dissolved in 900 parts of water. Half of this solution is heated to 80° C. together with 20 parts of 35% hydrogen peroxide in a polymerization vessel.

320 parts of butyl acrylate and 320 parts of vinyl propionate are emulsified in the other half and the resulting emulsion allowed to flow into the polymerization vessel in the course of 2 to 3 hours. Then the reaction mixture is kept at 85° to 90° C. for another hour and nitrogen led over the same during another hour.

A dispersion is obtained which has a pH of about 6 and which contains 40% by weight of polymer. The polymer has the $k$-value 70. The dispersion forms a colorless, sticky and somewhat cloudy film upon drying. It can be thickened with non-ionic thickening agents and is then suitable for sticking paper.

Example 11

A mixture of 525 parts of water, 64 parts of N-vinyl-N'-methyl-imidazolium methosulfate, 7 parts of N,N-diethyl-dodecyl-ammonium sulfate, 10 parts of polyvinyl pyrrolidone of the $k$-value 30 and 10 parts of 35% hydrogen peroxide is heated to 85° C. in a polymerization vessel. 224 parts of tertiary butyl acrylate and 96 parts of acrylonitrile are allowed to flow into the same in the course of 1½ hours. Then the reaction mixture is kept at 90° C. for another 2 hours.

A viscous dispersion is obtained which has the pH 3 and contains 42% by weight of solids. The particle size of the polymer is about 0.2 micron. The dispersion is compatible with electrolyte solutions, as for example aqueous solutions containing 20% by weight of calcium chloride or aluminum sulfate and is stable to the addition of dilute acids and alkalies. After having been frozen to —20° C. for 15 hours, it can be thawed again without deterioration and remains stable and free from coagulate even after storage for several days at +80° C.

Example 12

A mixture of 980 parts of water, 46 parts of N-vinyl-N'-methyl-imidazolium methosulfate, 13 parts of N,N-diethyl-dodecyl-ammonium sulfate, 20 parts of a copolymer prepared in the usual manner from 90% by weight of vinyl pyrrolidone and 10% by weight of N-vinyl-N'-benzyl-imidazolium chloride with the $k$-value 40, and 20 parts of 35% hydrogen peroxide is heated to 80° C. in a polymerization vessel. A mixture of 480 parts of tertiary butyl acrylate and 160 parts of methyl methacrylate is added thereto in the course of an hour and the reaction mixture kept at about 85° C. for another 2 hours.

A dispersion is obtained which has the pH 3, the surface tension 42 dynes/cm. and a solids content of 42% by weight. The dispersion is substantially stable to aqueous polyelectrolyte solutions and to heating at 80° C. for several days.

The $k$-value of the polymer is 57. When the dispersion is dried, a hard brittle polymer is obtained which melts above 70° C. to form a transparent film.

Example 13

A mixture of 450 parts of water, 5 parts of N,N-dimethyl-dodecyl-ammonium sulfate, 8 parts of polyvinyl pyrrolidone of the $k$-value 30 and 45 parts of N-vinyl-N'-methyl-imidazolium methosulfate is heated to 85° C. while stirring in a polymerization vessel. 25 parts of a mixture of 192 parts of tertiary butyl acrylate and 63 parts of methyl methacrylate as well as 8 parts of 35% hydrogen peroxide are added to the mixture. Polymerization sets in after a few minutes. The remainder of the ester mixture (230 parts) is then allowed to flow in in the course of 90 minutes and the temperature of the reaction mixture is kept at 80° C. Then the reaction mixture is kept for another hour at 90° C.

A finely particled dispersion is obtained which has a surface tension of 42 dynes/cm. and contains 40.5% by weight of a polymer having the $k$-value 57. The dispersion is suitable for surface sizing of paper:

A paper prepared from 50 parts of bleached sulfate pulp and 50 parts of bleached sulfite pulp of the beating degree 38° SR (cf. Memorandum No. 107 of the Verein der Zellstoff- und Papierchemiker und -Ingenieure), which has a weight of 70 g./m.², is dipped for a short time in a mixture of the said dispersion and 29,700 parts of water, pressed out and dried at about 80° C. A paper is obtained whose surface is very well sized against ink and contains about 0.7% by weight of polymer. Its ink flow test time (cf. P. Klemm, Handbuch der Papierkunde, 3d edition, Th. Griebens-Verlag, Leipzig, 1923, page 219) until total surface penetration is about 1 hour.

Example 14

A mixture of 1,060 parts of water, 384 parts of N-vinyl-N'-methyl-imidazolium methosulfate, 5 parts of N,N-dimethyl-dodecyl-ammonium sulfate and 15 parts of polyvinyl pyrrolidone of the $k$-value 30 is heated to 80° C. in a polymerization vessel and then 15 parts of 35% hydrogen peroxide are added. Then 336 parts of butyl acrylate and 144 parts of acrylonitrile are allowed to flow in in the course of 2 hours and the temperature of the reaction mixture is kept between 80° and 85° C. by cooling. The reaction mixture is then kept at 90° C. for another hour.

A viscous finely particled dispersion is obtained which appears red-brown in a thin layer in transmitted light and contains 44.5% by weight of solids. The $k$-value of the polymer is 58. The dispersion is suitable for the surface sizing of paper.

Unsized paper prepared from 100% bleached sulfite pulp is coated on one side in a coating machine with a mixture of this dispersion with 42,240 parts of water in such a way that the paper takes up about 0.5% of plastic with reference to the fibrous material. After drying, the paper can be written on with ink satisfactorily on the coated side, but the reverse side remains absorbent.

*Example 15*

A solution of 100 parts of N-vinyl-N'-methyl-imidazolium methosulfate, 10 parts of N,N-dimethyl-dodecyl-ammonium sulfate and 15 parts of polyvinyl pyrrolidone of the $k$-value 30 in 800 parts of water is heated to 80° C. in a polymerization vessel and then 15 parts of 35% hydrogen peroxide and 50 parts of a mixture of 240 parts of tertiary butyl acrylate and 240 parts of butyl acrylate are added. Polymerization commences after a few minutes. The remainder (430 parts) of the acrylate mixture is then allowed to flow into the polymerization vessel in the course of an hour. The reaction mixture is then kept at 90° C. for another hour.

A finely particled dispersion is obtained which contains 42.5% by weight of solid and which is compatible with aqueous solutions containing 20% by weight of calcium chloride or aluminum sulfate and also with dilute acids and alkalies. Its surface tension is 42 dynes/cm. The dispersion is suitable for the surface sizing of paper:

Unsized paper prepared from unbleached sulfate pulp and having a weight of 100 grams/m.² is coated on both sides in a coating machine with a mixture of the said dispersion and 54,130 parts of water in such a way that the paper takes up about 1% by weight of polymer, percentage based on the amount of paper. A paper well sized against ink is obtained.

*Example 16*

(A) A mixture of 275 parts of water, 1.8 parts of N,N-dimethyl-dodecyl-ammonium sulfate, 5.3 parts of polyvinyl pyrrolidone and 60 parts of N-vinyl-N'-methyl-imidazolium methosulfate is heated to 90° C. in a polymerization vessel. Then 4.2 parts of 35% hydrogen peroxide and 15 parts of a mixture of 125 parts of butyl acrylate and 53 parts of acrylonitrile are added. After about 15 minutes, the remainder of the mixture of butyl acrylate and acrylonitrile is allowed to flow in in the course of an hour and the temperature kept between 85° to 90° C. by occasional cooling. The reaction mixture is then kept at 90° C. for another 2 hours.

A viscous dispersion is obtained which contains 46% by weight of solids. It is compatible with aqueous solutions containing 20% by weight of calcium chloride or aluminum sulfate and substantially insensitive to variations in pH. It can be mixed with pigments such as kaolin, titanium white and iron oxide red.

This dispersion is eminently suitable for sizing paper.

(B) Parts of this dispersion are diluted with water to a solid content of 1% by weight (dispersion (*a*)) and 2% by weight (dispersion(*b*)). Samples of unsized paper are dipped into dispersion (*a*) (sample *a*) or (*b*) (sample *b*), squeezed out and dried. For comparison, a paper sized in the pulp with 2% by weight of commercial resin size and 3% of aluminum sulfate is prepared from the same paper pulp (sample *c*).

The sizing effect is tested in these samples and also for comparison in a sample of the unsized paper (sample *d*) according to the following methods:

(1) Pen stroke method (DIN 53,414)
(2) Ink flow test (P. Klemm, Handbuch der Papierkunde, 3rd edition, page 219)
(3) Cobb test (TAPPI standard T 441 M–45)
(4) Alkali sizing (by this we understand the time in minutes required for a drop of 10% aqueous solution of sodium hydroxide to penetrate a sheet of paper)

The results are collected in the following table:

| Sample | Plastic content | Stroke of pen | Ink flow test time in minutes until penetration | Cobb test | Alkali sizing |
|---|---|---|---|---|---|
| (*a*) Treated with 1% dispersion | 0.8% by weight | Good | About 70 | 29 | 90 |
| (*b*) Treated with 2% dispersion | 1.6% by weight | Very good | About 150 | 19 | 120 |
| (*c*) Blank sample with resin size | 2% by weight resin size, 3% by weight Al$_2$(SO$_4$)$_3$. | Good | About 50 | 28 | 1 |
| (*d*) Unsized blank sample | | Bad | | 112 | 0.3 |

(C) In the preparation of a paper from unbleached sulfate pulp which is to have a weight of about 75 grams/m.², part of the dispersion prepared under A in Example 16 and diluted to a content of 0.5% by weight of solid is applied to a web of paper using a sizing press installed in the usual manner in the drying part of the paper machine, in such a way that the finished paper contains about 0.4% by weight of polymer. A paper is obtained which is sized equally well against ink as a paper which has been prepared in the usual way from unbleached sulfate pulp with an addition of 2% by weight of commercial resin size and 3% by weight (in each case with reference to the amount of sulfate pulp) of aluminum sulfate to the suspension of the sulfate pulp in water. Paper sized on the surface with dispersion A is characterized by greatly superior resistance to alkaline-reacting liquids as compared with paper prepared in the conventional manner by using resin size.

(D) In the production of a printing paper, which is to have a weight of 70 grams/m.², from 50% by weight of bleached sulfite pulp of pine and 50% by weight of hardwood sulfite pulp with an addition of 10% by weight of kaolin, a mixture of 30 parts of the dispersion prepared under A, 15 parts of commercial polyethylene imine and 955 parts of water is applied to the web of paper using a sizing press installed in the usual manner in the drying part of the paper machine.

A printing paper is obtained which is sized very well against ink and printing inks and which has improved wet rub resistance as compared with untreated paper.

By using a mixture of 20 parts of the dispersion prepared under A, 10 parts of water-soluble starch and 970 parts of water, instead of the mixture containing polyethylene imine, a printing paper is obtained which is also very well sized against ink and printing inks and which additionally has improved resistance to picking and smaller tendency to dust.

(E) Paper prepared from bleached sulfite pulp is coated with a paint composed of 100 parts of kaolin (china clay), 10 parts of water-soluble starch, 45 parts of the dispersion prepared under A and 135 parts of water with the aid of a coating machine. A paper is obtained which has good resistance to picking and which can be written on with ink on the coated side.

What we claim is:

1. A process for the surface sizing of paper which comprises applying to the surface of paper an aqueous dispersion of the cation-active copolymer of (a) 15 to 50% by weight, based upon the total weight of the copolymer, of a heterocyclic compound bearing a single quaternary nitrogen atom in the nucleus, said heterocyclic compound being selected from the group consisting of the N- and C-vinyl substituted derivatives of imidazole, pyridine and quinoline, and (b) 85 to 50% by weight, based on the total weight of the copolymer, of difficulty water-soluble ethylenically unsaturated monomers.

2. A process as claimed in claim 1 wherein the aqueous dispersion contains a small amount of polyethylene imines.

3. A process as claimed in claim 1 wherein said copolymer is applied in an amount sufficient to provide a finished paper containing about 0.4 to 1.6% by weight of said copolymer.

References Cited by the Examiner

UNITED STATES PATENTS

| | | | |
|---|---|---|---|
| 2,698,793 | 1/55 | Landes et al. | 164—164 |
| 2,891,025 | 6/59 | Price | 260—29.6 |
| 3,068,213 | 12/62 | Rassweiler et al. | 117—155 X |

FOREIGN PATENTS 467,655  12/51  Italy.

RICHARD D. NEVIUS, *Primary Examiner.*

DANIEL ARNOLD, WILLIAM D. MARTIN,
*Examiners.*

UNITED STATES PATENT OFFICE
CERTIFICATE OF CORRECTION

Patent No. 3,174,874                                               March 23, 1965

Hans Fikentscher et al.

It is hereby certified that error appears in the above numbered patent requiring correction and that the said Letters Patent should read as corrected below.

Column 2, line 51, for "choride" read -- chloride --; column 3, line 40, for "$SO_4^{\ominus}$" read -- $SO_4H^{\ominus}$ --; column 4, line 53, for "anion" read -- anionic --; columns 9 and 10, in the table, second column, line 4 thereof, for "slze" read -- size --; column 12, line 7, for "164-164" read -- 162-164 --.

Signed and sealed this 24th day of August 1965.

(SEAL)
Attest:

ERNEST W. SWIDER
Attesting Officer

EDWARD J. BRENNER
Commissioner of Patents